Oct. 12, 1937.  T. W. VICKERS  2,095,560
SAFETY MECHANISM FOR HYDRAULICALLY OPERATED BRAKING SYSTEMS
Filed June 2, 1936  2 Sheets-Sheet 1
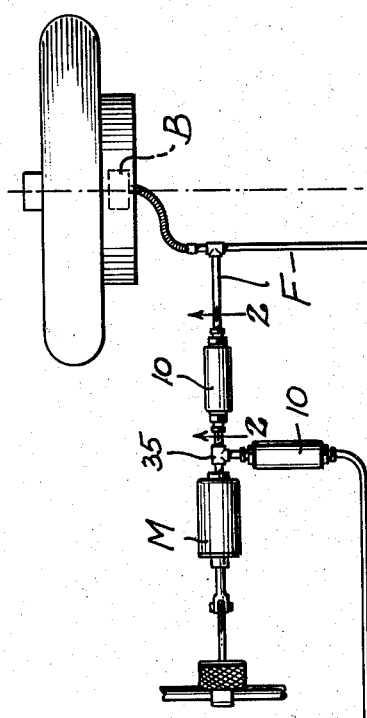
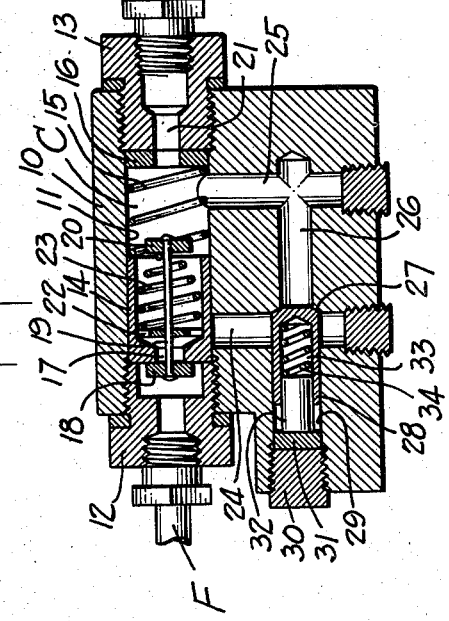
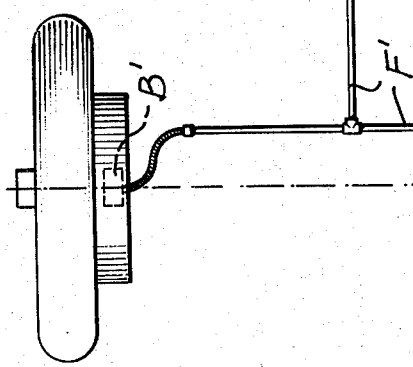
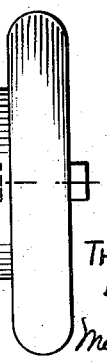
INVENTOR
THEODORE W. VICKERS
BY
Munn, Anderson & Liddy
ATTORNEYS Oct. 12, 1937.  T. W. VICKERS  2,095,560
SAFETY MECHANISM FOR HYDRAULICALLY OPERATED BRAKING SYSTEMS
Filed June 2, 1936  2 Sheets-Sheet 2
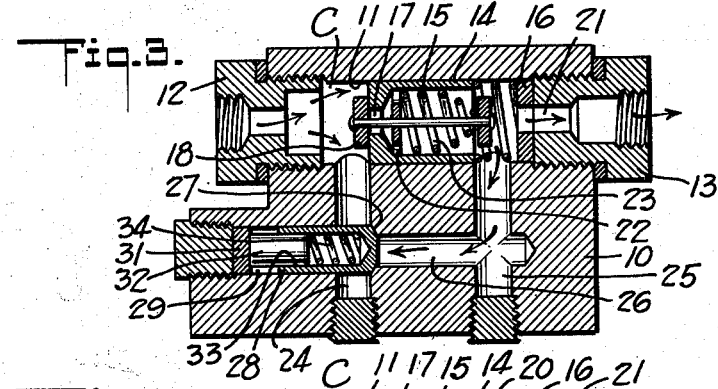
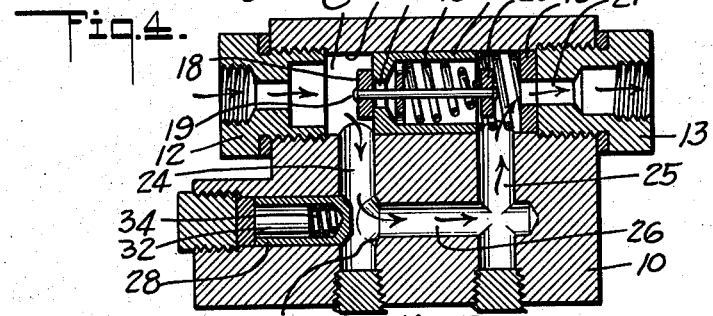
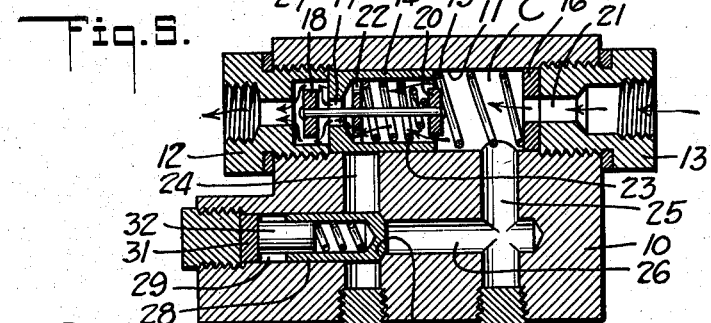
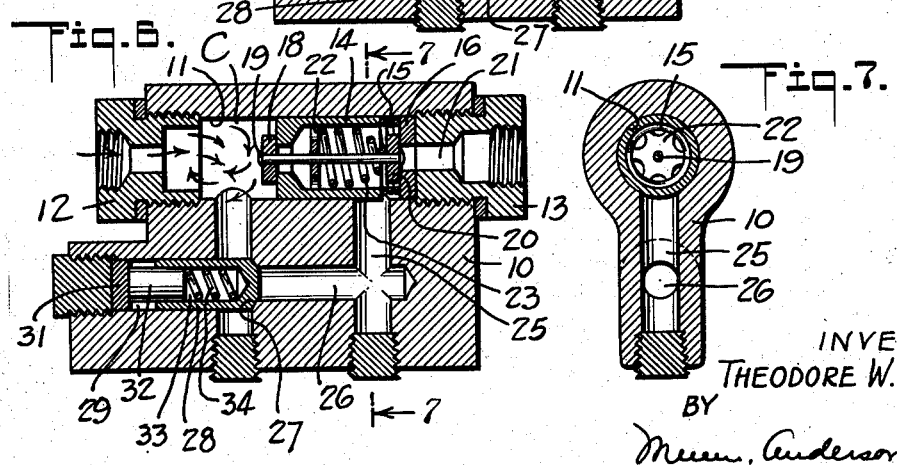
INVENTOR
THEODORE W. VICKERS
BY
Munn, Anderson & Liddy
ATTORNEYS Patented Oct. 12, 1937

2,095,560

UNITED STATES PATENT OFFICE 2,095,560

SAFETY MECHANISM FOR HYDRAULICALLY OPERATED BRAKING SYSTEMS

Theodore W. Vickers, Los Angeles, Calif.

Application June 2, 1936, Serial No. 83,104

15 Claims. (Cl. 303—84)

This invention relates generally to hydraulically operated braking systems of the character employed on vehicles.

In hydraulically operated braking systems as heretofore proposed, a sufficient leakage of fluid from the system either by breakage of a fluid line or a gravity leak, will result in such loss of pressure when an attempt is made to apply the brakes as to render the system inoperative, thereby creating the extremely dangerous situation of the vehicle being out of control in the absence of some other means to apply the brakes.

This condition is aggravated in the case of a leakage in the braking system of a vehicle wherein the brakes are badly worn and loose, so that should leakage occur, an independent manually operable mechanical means would also be ineffective to properly apply the brakes, thus failing to obviate the dangerous situation of a vehicle out of control due to lack of braking power.

An object of the invention is to provide a safety mechanism which, in its association with a hydraulically operated braking system, functions to insure that although a leak should occur in one portion of the braking system, other portions of the system will remain unaffected to provide a corresponding portion of the total braking power for maintaining control of the vehicle.

Another object of the invention is to provide a safety mechanism of the above described character which can be incorporated in a conventional braking system with ease and dispatch, and without the necessity for altering the system.

With these and other objects in view, the invention consists in the following combinations and arrangements of elements as embodied in the following specification and particularly pointed out in the appended claims.

In the accompanying drawings,

Figure 1 is a semi-diagrammatic plan view showing the safety mechanism embodying this invention incorporated in a conventional hydraulically operated four-wheel braking system of a motor vehicle;

Figure 2 is an enlarged vertical sectional view of the safety mechanism taken on the line 2—2 of Figure 1;

Figures 3, 4, 5 and 6 are views similar to Figure 2 but illustrating different positions of the working parts of the safety mechanism under various conditions of its operation;

Figure 7 is a transverse sectional view taken on the line 7—7 of Figure 6.

Referring specifically to the drawings, the safety mechanism comprises a metal body 10 preferably in the form of a casting provided with a longitudinally extending open ended bore 11 closed at its ends by threaded and tubular inlet and outlet plugs 12 and 13, respectively, coacting with the bore 11 to define a cylinder C in which is reciprocably mounted a cup-shaped piston 14 normally urged to the extreme position shown in Figure 2 by a spring 15 abutting one end of the piston and a yieldable annular valve seat 16 at the inner end of the outlet plug 12.

The base wall of the piston is provided axially with a port 17 controlled by a valve 18 in the form of a disk fixed to one end of a stem 19. The other end of this stem has fixed thereto a second valve 20 also in the form of a disk and adapted to control an outlet port 21 formed by the bore of the outlet plug 13. The stem 19 is mounted to freely slide in a spider 22 (Figure 7); and a spring 23 supported within the piston 14 to abut the spider and the valve 20 for co-action therewith in urging the stem with its valves 18 and 20 to the extreme position shown in Figure 2 wherein the valve 18 closes the by-pass port 17.

Communicating with the cylinder at opposite ends thereof are transverse ducts 24 and 25 connected by a longitudinal duct 26. At the juncture of the ducts 24 and 26, the latter is provided with an annular valve seat 27 with which is adapted to co-act a piston valve 28 working in a cylinder 29 coaxially arranged with respect to and forming an enlarged continuation of the duct 26. The outer end of the cylinder 29 is closed by a plug 30 against the inner end of which abuts a cushion bumper disk 31 engaged by a plunger 32 reciprocably mounted in the bore 33 of the piston valve 28. A spring 34 mounted in the bore 33 co-acts with the plunger 32 and the piston valve to urge the latter to the extreme position shown in Figure 2, wherein this valve engages the seat 27 to prevent flow of liquid from the inlet end of the cylinder C to the outlet end thereof unless a certain predetermined counter pressure or resistance is set up at the outlet end of the cylinder C, all in a manner and for the purpose to be fully described in the operation of the invention.

Referring particularly to Figure 1, the invention as above described is shown incorporated in a hydraulically operated braking system including a liquid displacement mechanism which specifically is the pedal operated master cylinder M from which the liquid lines F and F' lead, respectively, to a plurality of brake actuating devices specifically the front and rear wheel brake cylinders B, B and B', B', through the medium of a T-fitting 35. One of the safety mechanisms is interposed in each liquid line beyond the fitting 35 so that in the normal operation of the braking system, and with a sufficient quantity of liquid in the system, actuation of the brake pedal will cause the piston of the master cylinder to impose pressure upon the liquid in the system to effect the flow of liquid into the inlet end of the cylinder C through the inlet plug 12.

The operation of the invention is as follows:

With the brakes released under the usual return spring (not shown) associated with the shoes of each brake and loaded at from 30 to 70 pounds to urge the shoes to released position, the working parts of the safety mechanisms respectively embodied in the fluid lines F and F' to the front and rear pairs of brakes, respectively, will occupy the normal position shown in Figure 2.

With no leaks in the system, depression of the brake pedal to apply the brakes will first cause the flow of liquid from the master cylinder M to move the piston 14 towards the intermediate position shown in Figure 3 against the resistance offered at the brake cylinders B, B, B', B' to the flow of the liquid. The counter-pressure thus created reacts in the system from the outlet end of the cylinder C through the duct 25 and duct 26 as shown by the arrows in this figure, so as to act upon and move the piston valve 28 to the position shown in Figure 4.

Liquid from the master cylinder M now by-passes around the piston 14 through the inlet end of the cylinder C, ducts 24, 25 and 26 to the outlet end of the cylinder C and thence to the brake cylinder to effect an application of the brakes.

When the pedal is released with a corresponding drop in the line pressure, the piston 14 and piston valve 28 return to their respective normal positions, as shown in Figure 5, and the pressure in the brake cylinders caused by the urging action of the aforementioned return spring for the brake shoes, is exerted upon the valve 18 against the action of the spring 23, to open the port 17 and permit the return of liquid to the master cylinder M as shown by the arrows in this figure.

However, where the resistance or counter pressure normally created in the system at the individual brake cylinders is sufficiently reduced by leakage in either the portion of the system for the front wheel brakes or that portion of the system for the rear wheel brakes such as would result from breakage or perforation of a liquid line or leakage at the brake cylinders, depression of the pedal will cause the piston 14 to move to its other extreme position shown in Figure 6. In this position of the piston 14 the valve 20 will engage its seat 16 and close the port 21 so as to seal the outlet end of the cylinder C, thus preventing further loss of liquid from the system at the point of leakage so that the liquid will act in that portion of the system for the other pair of brakes to apply the latter and enable control of the vehicle to be maintained with two wheels instead of the four wheel brakes ordinarily available. It is desirable, although not necessary, that there be one safety mechanism for each pair of brakes rather than a mechanism for each individual brake, as equalization and safer braking are thereby provided.

It is to be noted that should such a leak develop in the system after the brakes have been applied, the sudden surge of liquid in the system will thus cause the valve 20 to engage its seat 16 and close the port 21, thus cutting off further flow of liquid in the line and maintaining applied those brakes whose liquid line remains intact.

In reference to the piston valve 28, it will be noted that the bumper disk 31 enables the valve to co-act therewith in providing a fluid-tight seal preventing the ingress of liquid from the system into the air chamber formed by the bore 33 of the valve. Any leakage of liquid into this air chamber would increase the pressure necessary to move the piston valve to its open position.

As will be evident, the pressure of air in the cylinder 29 around the plunger 32 will be sufficient to prevent flow of liquid between the piston valve and the wall of the cylinder 29. Since the pressure in this air space is determined by the pressure in the liquid lines there will normally be no displacement of either liquid or air into or out of this space. The piston valve is thus effectively sealed exteriorly and interiorly to insure its positive operation in either permitting or preventing the by-passing of liquid around the piston 14 according as the liquid system is intact or leaking.

It is to be understood that in a broad sense the ducts 24, 25 and 26 constitute a by-pass through which liquid in the line must flow in order to effect a brake application, and that the piston valve 28 controls the inlet from the line to the by-pass, whereas the piston 14 controls the outlet from the by-pass to the line. The piston and piston valve constitute fluid pressure responsive means, the piston 14 functioning to open or close the outlet according as the line is intact or leaking, and the piston valve functioning to open or close the inlet according as a predetermined resistance to liquid flow is present in the line upon a brake application or is reduced by a leak in the line.

What is claimed is:

1. In a hydraulically operated braking system of the type wherein liquid lines connect a master cylinder with a plurality of brake cylinders, a cylinder having an inlet and an outlet adapted to connect the cylinder in series with a liquid line between the master cylinder and the respective brake cylinder; a piston in the cylinder normally urged to one position and movable to another position by liquid in the line when pressure from the master cylinder is imposed thereon; means defining a by-pass connection between the inlet and outlet through which liquid in the line must pass from the master cylinder towards the respective brake cylinder in order to effect a brake application; a second cylinder; a piston valve in the second cylinder controlling said by-pass connection; means for urging the valve to close the by-pass connection so that when pressure from the master cylinder has moved said piston to its second mentioned position, and less than a predetermined resistance to the flow of liquid in the line exists at the respective brake cylinder from leakage in the line, further flow of liquid to such brake cylinder will be prevented; said urging means being ineffective to maintain the valve closed when the system is intact and the predetermined resistance to the flow of liquid in the line exists at the respective brake cylinder, whereby to permit the flow of liquid through the by-pass connection to apply the brake; and means by which the return flow of liquid can be effected independently of the by-pass connection in order to release the brake.

2. In a hydraulically operated braking system of the type wherein liquid lines connect a master cylinder with a plurality of brake cylinders, a cylinder having an inlet and an outlet adapted to connect the cylinder in series with a liquid line between the master cylinder and the respective brake cylinder; a piston in the cylinder normally urged to one position and movable to another position by liquid in the line when pressure from the master cylinder is imposed thereon; means defining a by-pass connection between the inlet and outlet through which liquid in the line must pass from the master cylinder towards the respective brake cylinder in order to effect a brake application; a second cylinder; a piston valve in the second cylinder controlling said by-pass connection; means for urging the valve to close the by-pass connection so that when pressure from the master cylinder has moved said piston to its second mentioned position, and less than a predetermined resistance to the flow of liquid in the line exists at the respective brake cylinder from leakage in the line, further flow of liquid to such brake cylinder will be presented; said urging means being ineffective to maintain the valve closed when the system is intact and the predetermined resistance to the flow of liquid in the line exists at the respective brake cylinder, whereby to permit the flow of liquid through the by-pass connection to apply the brake; and a check valve in the piston through which the return flow of liquid can be effected in order to release the brake.

3. In a hydraulically operated braking system of the type wherein liquid lines connect a master cylinder with a plurality of braking cylinders, means defining a by-pass connection between the inlet and outlet through which liquid must pass from the master cylinder towards the respective brake cylinder in order to effect a brake application; a valve controlling the by-pass connection; means for urging the valve to close the by-pass connection; means responsive to a predetermined resistance offered at the brake cylinder to the flow of liquid from the master cylinder through the respective line when intact, to cause said valve to be opened by the liquid for the flow thereof through the by-pass connection in order to effect a brake application; said urging means being operable to maintain the valve closed should less than the aforestated predetermined resistance be offered at the brake cylinder due to a leak in the line, whereby to prevent loss of the liquid.

4. In a hydraulically operated braking system of the type wherein liquid lines connect a master cylinder with a plurality of brake cylinders, a cylinder having an inlet and an outlet adapted to connect the cylinder in series with a liquid line between the master cylinder and the respective brake cylinder; a piston in the cylinder normally urged to one position and movable to another position by liquid in the line when pressure from the master cylinder is imposed thereon; means defining a by-pass connection between the inlet and outlet through which liquid in the line must pass from the master cylinder towards the respective brake cylinder in order to effect a brake application; and valve means co-acting with the piston to control the by-pass connection by opening or closing the latter according as the respective line is intact or leaking.

5. In a hydraulically operated braking system of the type wherein liquid lines connect a master cylinder with a plurality of brake cylinders, a cylinder having an inlet and an outlet adapted to connect the cylinder in series with a liquid line between the master cylinder and the respective brake cylinder; a piston in the cylinder normally urged to one position and movable to another position by liquid in the line when pressure from the master cylinder is imposed thereon; means defining a by-pass connection between the inlet and outlet through which liquid in the line must pass from the master cylinder towards the respective brake cylinder in order to effect a brake application; valve means co-acting with the piston to control the by-pass connection by opening or closing the latter according as the respective line is intact or leaking; and means by which the return flow of liquid can be effected independently of the by-pass connection in order to release the brake.

6. In a hydraulically operated braking system of the type wherein liquid lines connect a master cylinder with a plurality of brake cylinders, a cylinder having an inlet and an outlet adapted to connect the cylinder in series with a liquid line between the master cylinder and the respective brake cylinder; a piston in the cylinder normally urged to one position and movable to another position by liquid in the line when pressure from the master cylinder is imposed thereon; means defining a by-pass connection between the inlet and outlet through which liquid in the line must pass from the master cylinder towards the respective brake cylinder in order to effect a brake application; valve means co-acting with the piston to control the by-pass connection by opening or closing the latter according as the respective line is intact or leaking; and a check valve in the piston through which the return flow of liquid can be effected in order to release the brake.

7. In a hydraulically operated braking system of the type wherein a liquid line connects a liquid displacement mechanism with a brake actuating device, means defining a flow course between said mechanism and the brake actuating device through which liquid must pass from the mechanism in order to effect a brake application; a valve controlling said flow course; means responsive to brake applying movement of the liquid to cause said valve to open when the liquid line is intact so that liquid can flow through said flow course and effect a brake application; and means for maintaining the valve closed should a leak be present in the line, whereby to prevent loss of liquid.

8. In a hydraulically operated braking system of the type wherein a liquid line connects a liquid displacement mechanism with a brake actuating device, means defining a flow course between said mechanism and the brake actuating device through which liquid must pass from the mechanism in order to effect a brake application; a valve controlling said flow course; means responsive to brake applying movement of the liquid to cause said valve to open when the liquid line is intact so that liquid can flow through said flow course and effect a brake application; means for maintaining the valve closed should a leak be present in the line, whereby to prevent loss of liquid; and means by which the return flow of liquid can be effected when the valve is closed, in order to release the brake.

9. In a hydraulically operated braking system of the type wherein a liquid line connects a liquid displacement mechanism with a brake actuating device, means defining a flow course between said mechanism and the brake actuating device through which liquid must pass from the mechanism in order to effect a brake application; a valve controlling said flow course; means responsive to brake applying movement of the liquid to cause said valve to open when the liquid line is intact so that liquid can flow through said flow course and effect a brake application; means for maintaining the valve closed should a leak be present in the line, whereby to prevent loss of liquid; means co-acting with the valve to define an air chamber; and means for sealing the air chamber against the ingress of liquid from the system so as to insure positive operation of the valve.

10. In a hydraulically operated braking system of the type wherein a liquid line connects a liquid displacement mechanism with a brake actuating device, means defining a flow course between said mechanism and the brake actuating device through which liquid must pass from the mechanism in order to effect a brake application; a hollow piston valve controlling said flow course; means responsive to brake applying movement of the liquid to cause said valve to open when the liquid line is intact so that liquid can flow through said flow course and effect a brake application; means for maintaining the valve closed should a leak be present in the line, whereby to prevent loss of fluid; a plunger working in said valve and co-acting therewith to define an air chamber; and a sealing member adapted to co-act with the piston valve when open, to prevent the ingress of liquid into the air chamber from the system so as to insure positive operation of the piston valve.

11. In a hydraulically operated braking system of the type wherein a liquid line connects a liquid dislacement mechanism with a brake actuating device, means defining a flow course between said mechanism and the brake actuating device through which liquid must pass from the mechanism in order to effect a brake application; a hollow piston valve controlling said flow course; means responsive to brake applying movement of the liquid to cause said valve to open when the liquid line is intact so that liquid can flow through said flow course and effect a brake application; a plunger working in said valve and co-acting therewith to define an air chamber; a sealing member adapted to co-act with said valve when open, to prevent the ingress of liquid into the air chamber from the system so as to insure positive operation of the valve; and a spring in the air chamber co-acting with the valve and plunger to maintain the valve closed should a leak be present in the liquid line, whereby to prevent loss of liquid.

12. In a hydraulically operated braking system of the type wherein a liquid line connects a liquid displacement mechanism with a brake actuating device, means defining a flow course between said mechanism and the brake actuating device through which liquid must pass from the mechanism in order to effect a brake application; a valve controlling said flow course; means responsive to brake applying movement of the liquid to cause said valve to open when the liquid line is intact so that liquid can flow through said flow course and effect a brake application; means for maintaining the valve closed should a leak be present in the line, whereby to prevent loss of liquid; means co-acting with the valve to define a chamber in which air is compressed in response to opening movement of the valve; and means for sealing the chamber against the pressure of a brake application in order to prevent ingress of liquid to the chamber from the system.

13. In a hydraulically operated braking system having a liquid line connecting a liquid displacement mechanism with a brake actuating device, means for displacing liquid in a line by pressure developed at the liquid displacement mechanism, and operable to close the line against the loss of liquid or be ineffective to close the line according as a leak is present in the line or the latter is intact; means defining a by-pass in the liquid line adapted to conduct the liquid in effecting a brake application; and a valve normally closing the by-pass and operable in response to displacement of liquid by the first means when the liquid line is intact, to open the by-pass for the flow of liquid therethrough in order to effect a brake application.

14. In a hydraulically operated braking system having a liquid line connecting a liquid displacement mechanism with a brake actuating device, means for displacing liquid in a line by pressure developed at the liquid displacement mechanism, and operable to close the line against the loss of liquid or be ineffective to close the line according as a leak is present in the line or the latter is intact; means defining a by-pass in the liquid line adapted to conduct the liquid in effecting a brake application; a valve normally closing the by-pass and operable in response to displacement of liquid by the first means when the liquid line is intact, to open the by-pass for the flow of liquid therethrough in order to effect a brake application; means co-acting with the valve to define a chamber in which air is compressed in response to opening movement of the valve; and means for sealing the chamber against the pressure of a brake application in order to prevent ingress of liquid to the chamber from the system.

15. In a hydraulically operated braking system having a liquid line connecting a liquid displacement mechanism with a brake actuating device, a cylinder having an inlet and an outlet adapted to connect the cylinder in series with the liquid line between said mechanism and a brake actuating device; a piston in the cylinder for displacing liquid in the line by pressure developed at said mechanism, and operable to close or open the outlet according as a leak is present in the line or the line is intact; means defining a by-pass between the inlet and outlet; a second cylinder; and a piston valve in the second cylinder normally closing said by-pass and exposed to counter pressure imposed upon the liquid when pressure is developed by said mechanism and the line is intact, to open the by-pass for the flow of liquid around the piston in order to effect a brake application.

THEODORE W. VICKERS.